United States Patent
DeBlasio (12) 
(10) Patent No.: US 6,514,017 B2
(45) Date of Patent: Feb. 4, 2003

(54) CORE DRILL PILOTING SYSTEM

(76) Inventor: Michael J. DeBlasio, 409 King St., Littleton, MA (US) 01460

( * ) Notice: Subject to any disclaimer, the term of this patent is extended or adjusted under 35 U.S.C. 154(b) by 12 days.

(21) Appl. No.: 09/798,530

(22) Filed: Mar. 2, 2001

(65) Prior Publication Data

US 2002/0122702 A1 Sep. 5, 2002

(51) Int. Cl.⁷ .................. B23B 35/00; B23B 51/00
(52) U.S. Cl. .................. 408/1 R; 175/385; 175/403; 408/206; 408/239 R
(58) Field of Search .................. 408/1 R, 79, 80, 408/201, 239 R, 204, 206, 225; 175/57, 325.1, 385, 386, 388, 403, 406, 408

(56) References Cited

U.S. PATENT DOCUMENTS

| | | | | |
|---|---|---|---|---|
| 1,561,463 A | * | 11/1925 | Rochemont | 408/191 |
| 2,673,717 A | * | 3/1954 | Bacon | 175/386 |
| 2,816,737 A | * | 12/1957 | Kinard et al. | 175/386 |
| 2,853,904 A | * | 9/1958 | Mackey | 408/206 |
| 2,858,109 A | * | 10/1958 | Tengberg | 175/386 |
| 3,810,514 A | * | 5/1974 | Viscovich | 175/403 |
| 3,934,836 A | | 1/1976 | Dunlap et al. | 242/72.1 |
| 3,997,176 A | | 12/1976 | Wyckoff et al. | 279/2 R |
| 4,090,804 A | * | 5/1978 | Haley | 408/119 |
| 4,373,411 A | | 2/1983 | Kanakaris | 82/44 |
| 4,551,045 A | * | 11/1985 | Bossler | 175/405.1 |
| 4,699,389 A | | 10/1987 | Buck | 279/52 |
| 4,749,315 A | * | 6/1988 | Mills | 408/119 |
| 5,143,489 A | * | 9/1992 | Bogner et al. | 408/1 R |
| 5,388,936 A | | 2/1995 | Mihic | 409/234 |
| 5,868,400 A | | 2/1999 | Davis | 279/2.03 |
| 5,931,614 A | * | 8/1999 | Meyen et al. | 408/201 |

OTHER PUBLICATIONS

"Lathe Accessories"; McMaster–Carr Supply; p. 2197.

* cited by examiner

Primary Examiner—Daniel W. Howell
(74) Attorney, Agent, or Firm—Pandiscio & Pandiscio (57) ABSTRACT

A pilot tool assembly for a core drill comprises a pilot tool unit that fits within the core drill and expandable means engagable with the interior surface of the core drill for releasably locking the pilot tool unit to the core drill, the pilot tool assembly being removable from the core drill by application of an axial force to the pilot tool unit. The pilot tool unit comprises a pilot tool that projects from the front end of the core drill and serves as a centering aid for the core drill. The pilot tool may be inserted into a predrilled pilot hole whereby to keep the core drill centered on a desired location. The pilot tool may be a small diameter drill that is used to drill the pilot hole.

29 Claims, 4 Drawing Sheets

CORE DRILL PILOTING SYSTEM

This invention relates to core drills used in drilling holes in concrete, hard fired brick and the like, and more particularly to provision of means attachable to a core drill for a drilling a pilot hole for the core drill.

BACKGROUND OF THE INVENTION

The drilling of lengthy holes, e.g., holes 10–20 inches long, in structures or structural components made of concrete or other dense masonry materials is commonly accomplished with a core drill (also called "core drill bit") attached to a manually supported driver. A core drill commonly comprises an elongate hollow tubular member, one end of which is adapted to be releasably secured to the rotatable output shaft of a portable driver which typically is electrically powered but which may also be powered by a compressed gas such as air. Attached to the opposite end of the tubular member, usually by welding, is a tubular cutting head or bit that may comprise diamond or carbide particles embedded in a metal matrix. The core drill derives its name from the fact that as it drills into concrete or other dense material the interior of the drill fills with a solid core of the material that is being drilled. Typically water is injected into the core drill to facilitate the drilling process. When water is injected, the drilling process is identified as "wet coring".

A problem with using core drills in hand-held drivers occurs when it is necessary to drill holes in concrete at precise locations. It is difficult to keep the core drill bit from wandering laterally when drilling is initiated, with the result that the resulting drilled hole may be not be centered at the desired location. Accordingly efforts have been made to provide means that aid in piloting the core drill so as to keep it centered on a predetermined point. One approach has been to (a) provide a template made of wood having a hole sized so that the core drill will make a close fit therein, (b) position the template against the concrete so that the hole is centered on the desired center point for the hole to be drilled in the concrete, (c) position the core drill in the hole in the template, and (d) operate the driver for the core drill so as to cause the latter to drill a hole in the concrete at the precise position exposed through the template. The template is discarded after the core drill has penetrated the concrete to provide a hole of limited depth, e.g., ½ to 1 inch, after which that hole serves as a pilot hole for the core drill, which is then used to extend the hole to a desired depth. However, that approach suffers from the limitation that two persons are required to form the pilot hole, one to hold the template and the other to hold the driver with the core drill. Another approach that has been considered is to drill a small pilot hole using a small diameter drill bit mounted in a light weight driver, and then, using different size drill bits in the same driver, enlarge that hole incrementally to the diameter of the hole which is to be drilled using a given core drill. Then the core drill is used to extend that hole to a selected final depth. As another approach, a special centering aid for core drills has been made and offered for sale by Hilti, a corporation having a place of business at 12330 E. 60th Street South, Tulsa, Okla. 74121 as its "Item No. 00332495 Center Aid For Core Bits". However, on information and belief, that device has not been commercially successful.

OBJECTS AND SUMMARY OF THE INVENTION

A primary object of this invention is to provide a method and apparatus for piloting a core drill as it drills a hole in concrete, fired brick or like material.

Another primary object of this invention is to provide a novel means of detachably securing a pilot tool to a core drill.

Another object of this invention is to provide a pilot tool assembly which is designed to fit within a core drill and to be locked to the core drill by a tight friction fit.

A further object is to provide a centering aid for a core drill that comprises a pilot tool unit that fits within the core drill, and expandable means interposed between the pilot tool unit and the core drill for releasably locking the pilot tool unit to the core drill.

Still another object is to provide a pilot tool assembly for a core drill that comprises means for providing a quick-release attachment to the core drill.

A more specific object is to provide a pilot tool assembly for a core drill which comprises a pilot tool unit that is sized to extend within the core drill and expandable means interposed between the pilot tool unit and the core drill and engagable with the interior surface of, the core drill for releasably locking the pilot tool unit to the core drill, the pilot tool assembly being removable from the core drill by application of an axial force to the pilot tool unit.

The foregoing objects are achieved by providing a pilot tool assembly that comprises a pilot tool unit that includes an elongate mandrel and a pilot tool secured to and projecting from one end of the mandrel. The pilot tool assembly also includes an expandable locking sleeve that surrounds and engages the outer surface of the mandrel. The mandrel is tapered so that its outside diameter increases with increasing distance from one end thereof, and the sleeve is made so that moving it relative to the mandrel in the direction of increasing mandrel diameter will cause the sleeve to expand radially. The pilot tool assembly is inserted into the drill bit end of the core drill so that the sleeve will engage the inner surface of the core drill, whereupon further axial movement of the pilot bit assembly into the core drill will cause the sleeve to move along the mandrel until it has expanded enough to frictionally secure the mandrel to the core drill, thereby making the pilot tool an auxiliary extension of the core drill so that it can be inserted in a predrilled pilot hole in concrete or the like and thereby serve to pilot the core drill as it is operated to drill a larger hole of limited depth. After the limited depth hole has been formed by the core drill, the pilot tool assembly is removed from the core drill and the latter is then used to extend the hole to a desired final depth. Removal of the pilot tool assembly is achieved by use of a push rod which forces the mandrel in a direction to release the grip exerted by the locking sleeve. In one specific embodiment of the invention, the pilot tool is a drill bit that may be used to form the predrilled pilot hole or to extend the length of the predrilled pilot hole as the core drill forms a larger diameter start hole coaxial with the pilot hole.

Other objects, features and advantages of the invention are described or rendered obvious by the following detailed description of a preferred embodiment of the invention which is to be considered together with the drawings identified below.

DETAILED DESCRIPTION OF THE INVENTION

Figure 1:
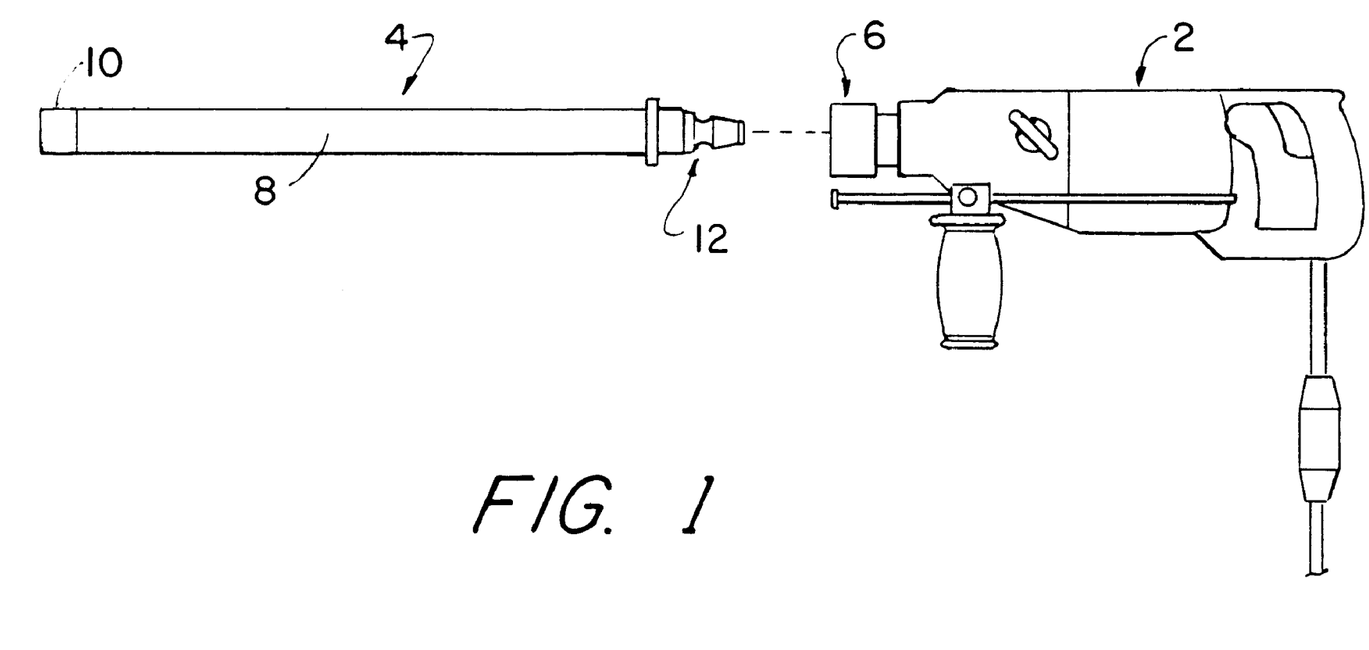
FIG. 1 is a side view in elevation of a conventional electrically-powered driver and a conventional core drill.
Figure 2:
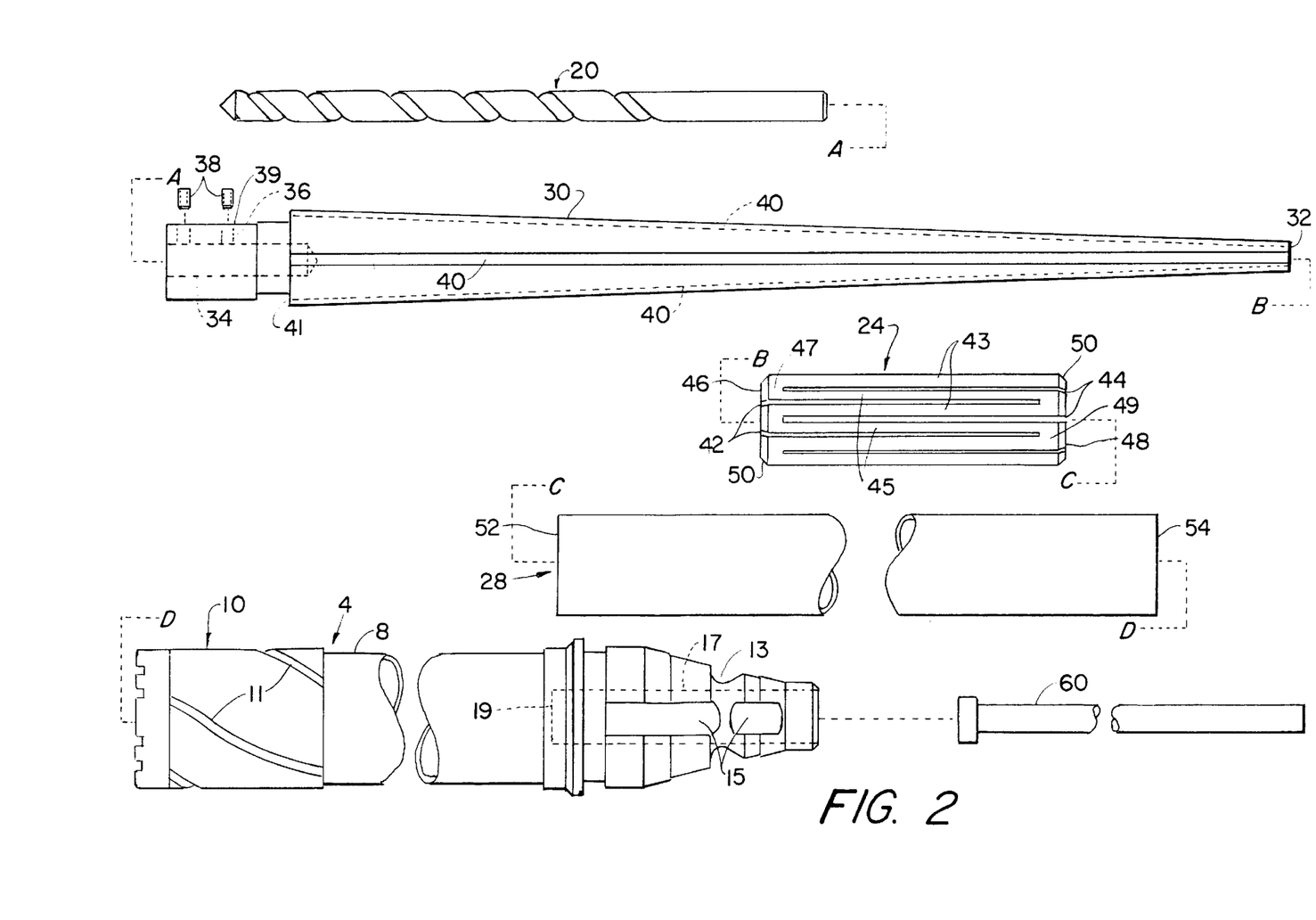
FIG. 2 is an exploded view in side elevation of a core drill and a pilot drill bit assembly embodying the present invention, including a push rod for releasing the pilot drill bit assembly from the core drill.

FIG. 1 shows an electrically-powered heavy duty driver 2 and a conventional core drill 4. Attached to output end of the driver is a conventional chuck 6 which is adapted to secure core drill 4 to the driver. Referring also to FIG. 2, core drill 4 comprises an elongate hollow cylindrical barrel 8 having a hollow cylindrical drill head or bit 10 affixed to its forward end. The drill head 10 may have the same outside diameter as barrel 8 or, as shown in FIG. 2, its o.d. may be slightly larger. Typically the drill head 10 comprises diamond or silicon carbide particles embedded in a strong metal matrix. The drill head 10 is welded to and has substantially the same outside diameter as barrel 8. The design and construction of drill head 10 is not critical to this invention. For example, the front edge of the cutting head 10 may, but need not, be notched as shown in FIG. 2. Commonly the drill head 10 also has several shallow spiral grooves 11 (FIG. 2) in its outer surface adjacent to drill head 10 to facilitate the drilling process. Affixed, e.g., by welding, to the opposite or rear end of barrel 8 is a connector member 12 which is adapted to attach the core drill to chuck 6. Preferably the chuck 6 is of the quick release variety and the connector member 12 is constructed so as to make a quick release connection with the chuck.

The present invention may be used with a core drill/driver combination that is used for dry coring, i.e., drilling without use of water, in which case the core drill is connected directly to the driver by chuck 6. However, for many applications wet coring is preferred. In such case, a conventional water swivel (not shown) is interposed between and connects core drill 4 to chuck 6. Water swivels, as well as a variety of drivers 2 and chucks 6 are available commercially from a number of companies, including the Hilti organization identified above, e.g., Hilti's DD 100 ⅝" Water Swivel. The water swivel functions to rotatively connect the core drill to the chuck and also to inject water into the core drill. With respect to the latter function, the water swivel typically has an inlet port to which is connected a water feed tube that is adapted to be connected to a pressurized water supply tank (also not shown), whereby water will flow into the water swivel 10 housing and from there into the outer end of the core drill during a drilling operation.

The design and construction of chuck 6 and connector member 12 are not critical to and form no part of the present invention, and the invention may be practiced with a variety of chucks and connector members. The same is true, for example, of any intervening devices such as a water swivel head that may be used to attach the core drill to the driver. Thus, by way of example but not limitation, chuck 6, connector member 12, and any intervening mechanical devices, such as a water swivel, may be adapted for coupling to one another by a screw or bayonet type connection. Preferably, but again by way of example, the connector 12 may have a peripheral groove 13 and one or more axially extending slots 15 (FIG. 2), and the chuck 6 may be a quick release device having one or more movable lock elements (not shown) that interlock with groove 13 and slots 15 and actuating means (also not shown) for moving the lock elements into and/or out of locking relation with the groove 13 and slots 15. Further by way of example, the chuck 6 may embody a quick release connection mechanism having a spring-biased actuating ring for effecting disconnection, similar to the connectors used for attaching air hoses to pneumatic components or flexible gas lines to small propane tanks used for gas grills. The essential requirement is that the chuck 6 and the connector 12 be of a design such that the core drill will be releasably locked to and form an axial extension of the driver's output shaft, whereby the full torque output of the driver is imparted to the core drill in order to effect the desired drilling action.

The invention provides a pilot tool assembly for a core drill comprising a pilot tool and a supporting and locking assembly for the pilot tool. In a preferred embodiment shown in FIGS. 2 and 3, the pilot tool is in the form of a masonry drill 20 and the supporting and locking assembly comprises a solid metal mandrel 22 and a radially expanding metal locking sleeve 24. The practice of the invention may also require use of an extender sleeve 28 as described below.

FIG. 2 illustrates one type of drill that may be used as a pilot tool in practicing the invention. However, the type and size of the pilot drill may be varied. A pilot drill of the type shown in FIG. 2 may have one or more cutting flutes, with the pitch of the flutes being selected to optimize drilling in concrete or fired masonry structures. Other forms of masonry drills also may be used in place of drill 20.

The solid mandrel 22 is intended to be inserted into the front, end of the core drill and is sized to make a sliding fit within the core drill. Mandrel 22 has a tapered surface 30 of circular cross-section and its rear end is terminated by a flat end surface 32 as shown. Preferably, but not necessarily, the maximum diameter of the mandrel is between about 0.020 inch to about 0.080 inch less than the inner diameter of barrel 8.

The combination of a tapered mandrel and an expandable locking sleeve is well known in the machine tool industry as a means for supporting and centering a work piece in a lathe. For the purposes of this invention the forward end of mandrel 22 is provided with a center axially-extending hole 34 sized to receive a pilot tool, e.g., a drill as shown at 20. One or more radially-extending tapped holes 36 are formed in the mandrel adjacent its forward end and set screws 38 are screwed into those holes to firmly and releasably secure the pilot drill to the mandrel. Essentially when the pilot tool 20 and the mandrel are secured together by set screws 38, they form a pilot tool unit, with the pilot tool being replaceable with another like pilot tool or another pilot tool of different size or shape. Although not required, it is preferred to modify the cylindrical front end of the mandrel with a planar surface 39 in the event that the set screws are provided with enlarged heads.

Figure 3:
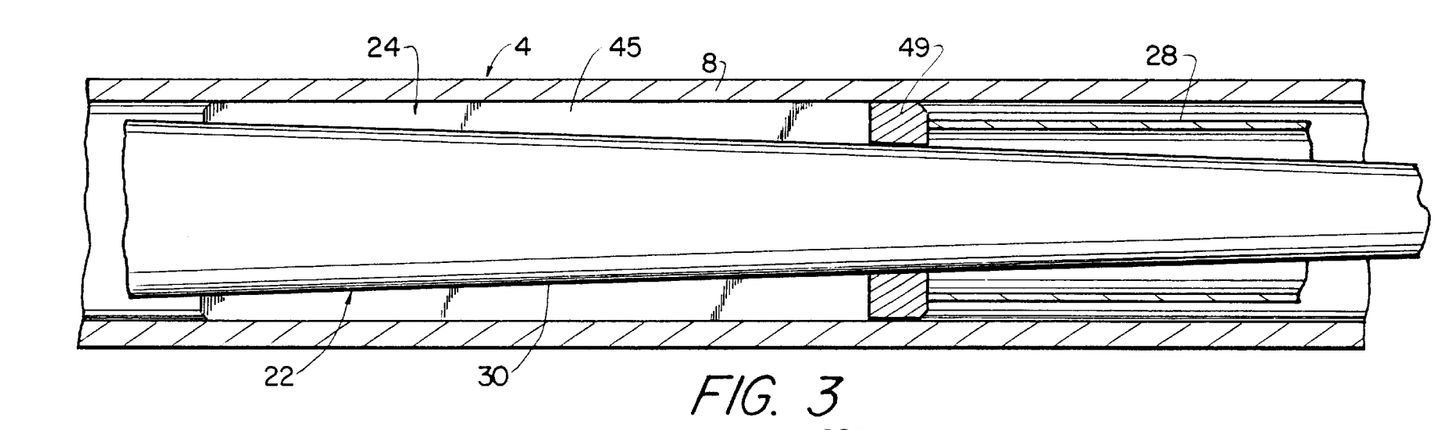
FIG. 3 is fragmentary longitudinal sectional view on a larger scale illustrating how the pilot drill bit assembly is locked to the core drill tube.
Figure 4A:
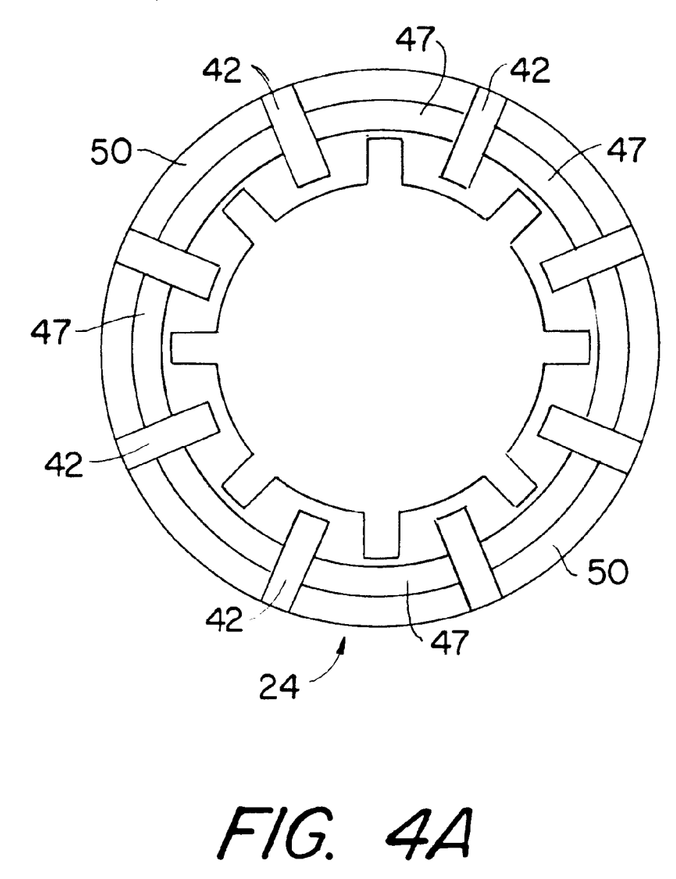
FIGS. 4A and 4B are left and right end elevation views respectively (as viewed in FIG. 2.) of the locking sleeve that forms part of the pilot drill bit assembly.
Figure 4B:
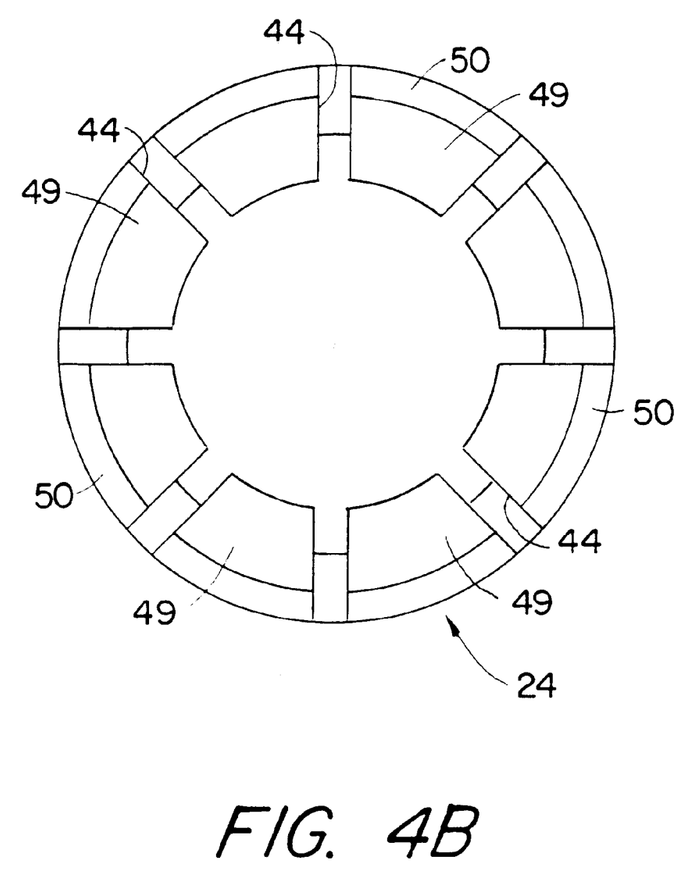

Referring to FIG. 2, for wet core drilling wherein a water swivel (not shown) is interposed between the driver and the core drill, the mandrel is provided with one or more grooves 40 in its outer surface for the purpose facilitating flow of water through the core drill despite the presence of mandrel 22 and locking sleeve 24 (grooves 40 are omitted from FIG. 3 for convenience of illustration, and also to make the point that they are not needed for dry core drilling). The grooves may have a curved or generally rectangular cross-sectional shape, but they may have other cross-sectional shapes so long as they can function to carry water as intended and do not prevent locking sleeve 28 from making a locking connection to the mandrel. By way of example but not limitation, grooves 40 may be generally rectangular in cross-section, measuring approximately ⅛th inch deep and 3/16th inch wide. The grooves 40 may extend for the full length of the mandrel as shown. Alternatively, they may terminate short of the shoulder 41 and or the end surface 42 of the mandrel. However, grooves 40 must be located and sized so that they extend beyond the front and back ends of the locking sleeve 24 when the mandrel is locked to the core drill as hereinafter described, whereby to insure that water can flow through the core drill as required for wet drilling. Preferably, more than one groove 40 is provided and the several grooves are spaced uniformly around the perimeter of the mandrel so as to avoid any rotational imbalance during the drilling process. A satisfactory arrangement is four grooves 40 spaced apart by 90 degrees.

As shown in FIGS. 2 and 3, the radially expandable locking sleeve 24 surrounds the tapered surface 30 of the mandrel. Preferably the locking sleeve is made of metal and is formed with a plurality of slots 42 and 44 that extend lengthwise and intersect the front and back ends 46 and 48 respectively of the sleeve, leaving parallel alternately-occurring mutually spaced sections 43 and 45 that are connected by end web sections as shown at 47 and 49. The opposite ends of sleeve 24 may, but need not, be beveled as shown at 50. Slots 42 and 44 permit the sleeve to expand radially under an expanding force created as described hereinafter.

Sleeve 24 is made so that in its as-formed state its outer surface has a constant diameter throughout its length, while its inner surface is tapered so that its diameter increases in the direction of its forward (front) end 46. As a result the wall thickness of the sleeve varies, being thickest at it back end 48 and thinnest at its front end 46. Sleeve 24 has a length substantially less than that of the mandrel. Sleeve 24 is made so that in its unexpanded condition, i.e., in its as-formed state, its outer diameter is slightly smaller than the inside diameter of the core drill, preferably about 0.005 inch to about 0.010 inch smaller, so as to allow the sleeve to make a sliding fit within the core drill. Preferably the inner surface of sleeve 24 is tapered with the same slope, i.e., the same angle of taper, as the outer tapered surface 30 of the mandrel. The maximum inner diameter of sleeve 24 is less than the maximum o.d. of mandrel surface 30 and the minimum inner diameter of sleeve 24 is greater than the minimum diameter of mandrel surface 30. The sleeve 24 and mandrel 22 are sized so that the sleeve can be slipped over the mandrel and moved a substantial distance away from the back end surface 32 of the mandrel (but short of the front end of the mandrel) before its inner surface fully engages the outer surface of the mandrel. Consequently, further relative movement of the sleeve away from end surface 32 will result in the mandrel exerting an increasing expansion force on the sleeve. Preferably sleeve 24 has a relatively thin wall, preferably in the range of about 0.025 inch to about 0.040 inch at its front end and between about 0.030 inch to about 0.050 inch adjacent its back end, so as to facilitate its radial expansion by the mandrel when is moved lengthwise away from the mandrel back end 32.

In the usual case, the connector member 12 is formed so that its front end extends within and is secured to the back end of the core drill, so that its cylindrical inner surface, represented schematically in FIG. 2 by the dotted lines 17, has a substantially smaller diameter than the core drill (the annular front end surface of connector 12 located inside of the barrel is represented schematically by dotted line 19). Accordingly it is contemplated that mandrel 22 and locking sleeve 24 will be inserted together into the core drill via the drill head 10.

The length of the mandrel may vary, but it is shorter than the core drill with which it is used. Moreover, its length must be such that when it is inserted into and locked to the core drill barrel 8 by locking sleeve 24, (a) its front end will be withdrawn within the core drill a selected distance at least equal to the depth of a "start hole" that is to be created by the core drill while it carries the pilot tool, and (b) its rear end will be spaced from the connector 12. As used herein, the term "start hole" is used to identify a relatively short hole that is formed by the core drill using the pilot tool as a centering aid. By way of example, when the mandrel is locked to the core drill by sleeve 24, the front end of the mandrel is about 3 inches behind the front end of core drill head 10, with the result that a start hole approximately 3 inches deep can be created by the core drill as it is piloted by the pilot tool.

It also is essential that some means be provided to stop rearward movement of the locking sleeve surrounding the mandrel after they have been inserted into the core drill a suitable distance, so that further rearward movement of the mandrel in the core drill will result in relative movement between the mandrel and the locking sleeve, causing the mandrel to expand the locking sleeve into tight engagement with the inner surface of the core drill. It is recognized that the foregoing requirement could be met by making locking sleeve 24 long enough so that when it and the mandrel are inserted into the core drill, it will be stopped by engagement of its end surface 48 with the front end surface 19 of connector 12. However, that approach is not preferred since core drills are available in different lengths to permit drilling holes of different lengths, and different length locking sleeves would be required for different length core drills. Furthermore, locking sleeves of the slotted type illustrated in the drawing are expensive to manufacture. Instead, an extender sleeve 28 is used to increase the effective length of the locking sleeve. Preferably extender sleeve 28 has an outer diameter that allows it to make a sliding fit inside the core drill. By way of example but not limitation, the outer diameter of sleeve 28 may be about 0.005 inch to about 0.040 inch less than the inner diameter of the core drill, so as to facilitate its insertion into the core drill and so as to avoid any misalignment problem. In FIG. 3, the gap between extender sleeve 28 and the inner surface of the core drill is exaggerated for ease of illustration and identity. Preferably also the inner diameter of extender sleeve 28, at least at its front end surface 52 which is nearest the pilot drill end of the mandrel, is about the same as or slightly greater than the inner diameter of the back end 48 of locking sleeve 24, so that its forward end 52 can engage the back end of the locking sleeve.

Extender sleeve 28 has a length such that when its back end surface 54 is engaged with the forward end surface of connector 12, it will intercept locking sleeve 28 after the front end of the mandrel is recessed within the core a short distance, with the pilot drill projecting forward from drill head 10, so that on further movement of the mandrel and pilot drill toward the back end of the core drill the locking sleeve 28 will be engaged by progressively larger diameter portions of mandrel surface 30, causing the sleeve to expand into tight engagement with the core drill's inner surface while simultaneously gripping the mandrel, thereby producing a secure locking connection between the mandrel and core drill. In this locked position, the amount that the mandrel is recessed back from the front end of the core drill will determine the maximum length of the start hole to be drilled as described hereinafter.

It should be noted that a given mandrel and locking sleeve may be used for different length core drills of the same diameter, with only different length extender sleeves being required for different length core drills. However, extender sleeve 28 may be a simple metal or plastic tube, so the cost of having different length extender sleeves is not excessive.

Installation of the pilot drill assembly in the core drill is straightforward and is explained with reference to the components shown in FIG. 2. In this connection, in FIG. 2, the letters "a"–"d" and the broken lines extending between those letters are used to indicate the relationship of the several components. Thus, for example, the two letters "B" and the intervening dotted line indicate that the sleeve 24 is to be slipped onto the back end of the mandrel with the front end 46 of the sleeve facing the front end of the mandrel.

The order of assembly commences with inserting extender sleeve 28 into the front end of the core drill. Then the subassembly consisting of mandrel 22, pilot drill 20 installed in the front end of the mandrel, and locking sleeve 24 surrounding mandrel 20, with the locking sleeve in a non-expanded state or expanded just enough to hug the mandrel but with its outer diameter still smaller than the inner diameter of the core drill, is inserted into the front end of the core drill so that the rear end 48 of locking sleeve 28 engages or lies adjacent to the front end 52 of extender sleeve 28. Then the mandrel with sleeve 24 is forced back in the direction of extender sleeve 28. This is most easily accomplished by orienting the core drill so that it extends vertically with the pilot drill 20 extending downward, and then pressing the front end of the pilot drill against a horizontal floor or platform with sufficient pressure to force the mandrel toward the extender sleeve, with the result that the extender sleeve stops rearward movement of the locking sleeve while the mandrel moves axially relative to the locking sleeve. This backward movement of the mandrel relative to locking sleeve 24 results in a wedging action that forces the locking sleeve to expand into tight engagement with the inner surface of the core drill, thereby locking the mandrel and the pilot drill to the core drill. This locking action is sufficiently great to impart to the pilot drill the full torque of the core drill as the latter is rotated by the powered driver 2 without any slippage of the pilot drill relative to the core drill, so that the pilot drill bit may now be used effectively to drill a pilot hole that will facilitate use of the core drill, or used solely as a centering aid involving co-action with a pre-drilled pilot hole as hereinafter described.

Because of the strength of the locking grip exerted by locking sleeve 24 on both the mandrel and the core drill, and also because the front end of the locked mandrel is withdrawn from the front end of the core drill, it is not feasible or practical to effect removal of the pilot drill assembly from the core drill by manually pulling on and/or twisting the pilot drill relative to the core drill, particularly since removal needs to be accomplished without damaging the pilot drill, the mandrel or the locking sleeve. Nevertheless removal of the pilot drill bit assembly can be accomplished easily by use of a push rod as shown at 60 that has a maximum diameter smaller than the inner diameters of connector 12 and extender sleeve 28 but large enough to make contact with the rear end surface 48 of the mandrel.

The first step in removing the pilot drill is to detach the core drill from the driver 2, or from any intervening mechanism such as a water swivel water device. The next step is to insert push rod 60 into the open rear end of the core drill into engagement with the mandrel's rear end surface 32. Then rod 60 is forced forward in the core drill, pushing the mandrel axially toward the front end of the core drill. This movement of the mandrel in the core drill also causes it to move axially relative to locking sleeve 28, freeing the mandrel and allowing the locking sleeve to contract radially to its original size. Then mandrel 22 carrying pilot drill 20 and also sleeve 36 are withdrawn from the core drill, leaving the latter ready to drill an extended length hole.

The apparatus shown in FIGS. 1–4B may be used in different ways to facilitate core drilling of lengthy holes at precise locations in concrete or other masonry structures. A preferred method of doing this according to the invention involves the following steps. First of all, a relatively small diameter pilot hole of selected length, e.g., a hole made with a ¼ inch diameter masonry drill bit, is drilled in a given concrete structure at a predetermined location. This can be done precisely using a light weight drill as the driver and the pilot drill 20 or some other drill bit of the same size. Preferably the depth of the pilot hole is equal to or greater than the distance that pilot drill 20 bit projects from the front end of core drill 4 when the mandrel is locked in place in the core drill as described above. Then, with the core drill attached to a driver 2 and drill bit 20 attached to core drill 4 by mandrel 22 and locking sleeve 28 as described above, drill bit 20 is inserted into the pilot hole and the front end of the core drill engaged with the concrete structure, and the driver 2 is activated, where upon the core drill will bore a larger diameter "start" hole in the concrete structure, with the drill bit coacting with the pilot hole to keep the core drill from moving laterally, with the result that the start hole created by the core drill will be coaxially aligned with the original pilot hole. The maximum depth of the start hole is determined by the amount or drilled-out concrete "core" that can accumulate inside the core drill, which in turn is determined by the amount that the front end of the mandrel is retracted from the front end of the core drill. After the start hole has been formed, the driver 2 is stopped and pulled back so as to remove the pilot drill and the core drill from the concrete structure. Thereafter, the start hole is extended to a selected final length by additional core drilling using the same core drill, or a different core drill of the same size. Using the same core drill involves detaching the core drill from driver 2, then removing pilot drill assembly from the core drill, and then reattaching the core drill to the driver. Using a second like size core drill to complete the core drilling operation offers the advantage that the pilot drill assembly need not be detached from the core drill to complete the core drilling operation.

The foregoing method may be modified by providing a pre-drilled pilot hole whose depth does not exceed the amount that the pilot drill projects from the core drill. In fact, the pre-drilled pilot hole may be relatively short, just enough to serve as a start hole for pilot drill 20. Then, as in the foregoing method, the pilot drill is inserted into the pre-drilled hole. However, in this case the front end of the core drill cannot immediately engage the concrete structure. Therefore, when the driver is activated, the only drilling that occurs initially is that produced by the pilot drill which extends the pilot hole depth to a point where the front end of the core drill can engage the concrete structure. Thereafter the drilling is continued long enough to allow the core drill to create the larger diameter start hole as previously describe, but with that drilling occurring concurrently with continued pilot hole drilling by pilot drill 20. In this modified form of the method, the pilot drill acts as a centering aid for the core drill at the same time that it operates to extend the pilot hole. This modified method is not preferred since forming the extended length pilot hole required to enable the core drill to create start hole is best accomplished using a pilot drill that is not attached to the core drill.

Although it is preferred that the pilot tool be a masonry drill bit as exemplified at 20, it need not be a drill bit at all, in which case a pre-drilled pilot hole is required to be made by a separate drill. In this connection, attention is drawn to FIG. 5 which shows another form of mandrel 22A carrying a pilot tool in the form of a rod 20A of selected length. Preferably the rod has a circular cross-sectional shape and a smooth surface to facilitate its rotation in the pre-drilled pilot hole. However the rod may have some other symmetrical cross-sectional shape, but it must be sized so that it will make a close rotational and sliding fit in the pre-drilled pilot hole. Use of a rod 20A in place of pilot drill 20 mandates that the pre-drilled pilot hole exceed the effective length of the rod as a pilot tool, i.e., the length of that portion of the rod that protrudes from the front end of the core drill, by a substantial amount in order to allow the core drill to create a start hole of acceptable length. The start hole is made by inserting rod 20 in the pre-drilled pilot hole and then operating the driver so as to cause the core drill to form the start hole. The rod coacts with the pilot hole to keep the core drill on center in the manner described above using drill bit 20. After the start hole has been formed, the supporting mandrel carrying the rod, the locking sleeve and extender sleeve are removed from the core drill and then the latter is reinserted in the starter hole and used to extend that hole to a desired length.

Figure 5:
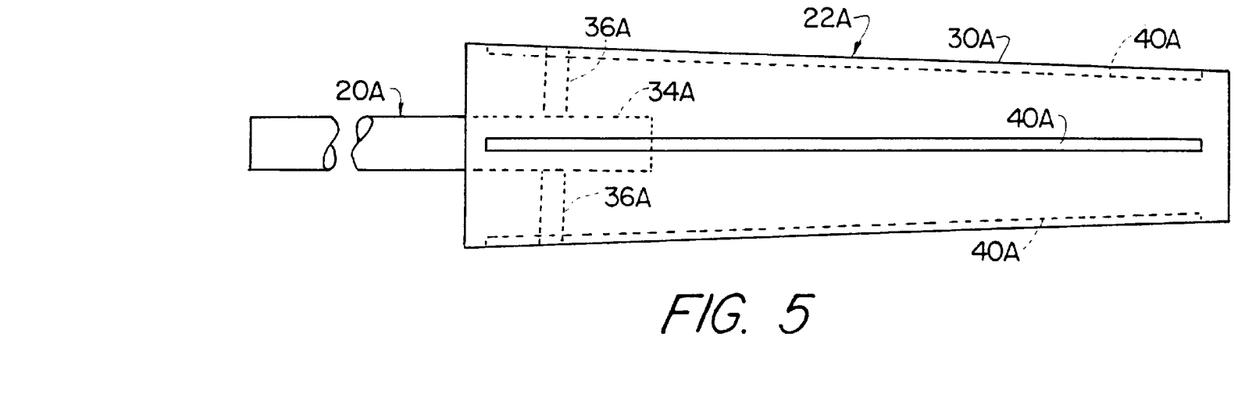
FIG. 5 is a side view in elevation of an alternative form of mandrel and pilot tool.

The alternative form of mandrel shown in FIG. 5 is preferred over the one shown in FIGS. 2 and 3 because of its simplicity and hence lower cost. In this case the mandrel's outer surface 30A is conical throughout the length of the mandrel, and the mandrel has an axially-extending center hole 34A at its front end for receiving a pilot tool. The latter may be a pilot drill 20 or a non-drilling pilot tool such as rod 20A. Set screws (not shown) are screwed into tapped holes 36A to secure pilot tool 20A to the mandrel. For wet core drilling, a plurality of longitudinally-extending grooves 40A may be provided in the mandrel's outer surface 30A to facilitate flow of water inside the core drill.

It is recognized that core drills for drilling in concrete or other hard, dense masonry materials come in different diameters. Accordingly it is contemplated that mandrels of different maximum diameters may be provided for different diameter core drills and different size locking sleeves may be required for different size mandrels. However, it also is contemplated that a single mandrel of a particular maximum diameter may be used with several different diameter core drills by using locking sleeves with different outside diameters for the different core drills. The angle of taper of the mandrel also may be varied. Of course, regardless of mandrel size or shape, the mandrel may be combined and used with pilot tools in the form of drills as shown at 20 or in the form of non-drills as shown at 20A.

It is to be understood also that the particular mandrel/ locking sleeve design and construction shown in the drawings may be replaced by a locking sleeve/mandrel combination of different design and construction. Similarly different forms of pilot drills may be used in the practice of this invention. It also is contemplated that the pilot tool may be attached to the mandrel by means other than by set screws as shown at 32. Thus, for example, the pilot tool could be designed for attachment to the mandrel by a retaining collar that is screwed onto the end of the mandrel, the retaining collar being sized to fit within the core drill. Still other modifications and variations of the invention will be obvious to persons skilled in the art from the foregoing description and the FIGS. 1–5.

What is claimed is:

1. A pilot tool assembly for a core drill comprising:
    a pilot tool unit that includes an elongate mandrel having first and second opposite ends and a pilot tool secured to and projecting from first end of the mandrel, said mandrel having a tapered outer surface characterized by a diameter that increases with increasing distance from second end thereof; and
    an expandable locking sleeve that surrounds and engages said outer surface of said mandrel, said sleeve being made so that moving it relative to the mandrel in the direction of increasing mandrel diameter will cause the sleeve to expand radially, whereby when said pilot tool assembly is inserted into a core drill said sleeve will engage an inner surface of the core drill and will move axially relative to the mandrel until it has expanded enough to frictionally secure the mandrel to the core drill, thereby making the pilot tool an auxiliary extension of the core drill.

2. A pilot tool assembly for a core drill according to claim 1 further characterized in that said sleeve and said mandrel are arranged so that if said sleeve has been expanded radially by said mandrel, axial movement of said mandrel relative to said sleeve in the direction of increasing mandrel diameter will free said sleeve to contract radially.

3. The combination of a core drill for drilling deep holes in concrete and a pilot tool assembly for said core drill;
    said core drill comprising an elongate hollow cylindrical barrel having a cylindrical drill bit at one end thereof;
    said pilot tool assembly comprising a pilot tool unit adapted to extend into and project from said one end of said cylindrical barrel, and locking means for releasably locking said pilot tool unit to said core drill;
    said pilot tool unit comprising an elongate mandrel and a pilot tool secured to and projecting from one end of the mandrel, said mandrel being tapered so that its outside diameter increases with increasing distance from one end thereof; and
    said locking means comprising an expandable sleeve that surrounds and engages the outer surface of the mandrel, said sleeve being made so that moving it relative to the mandrel in the direction of increasing mandrel diameter will cause the sleeve to expand radially, whereby when said pilot tool assembly is inserted into the drill bit end of said core drill said sleeve will engage the inner surface of the core drill and will move axially along the mandrel until it has expanded enough to frictionally secure the mandrel to the core drill, thereby making the pilot tool an auxiliary extension of the core drill.

4. The combination of claim 3 wherein said sleeve and said mandrel are arranged so that if said sleeve has been expanded radially by said mandrel so as to frictionally secure the, mandrel to the core drill, axial movement of said mandrel relative to said sleeve in the direction of increasing mandrel diameter will allow said sleeve to contract radially to free said mandrel from said core drill.

5. The combination of claim 3 wherein said core drill has an open end opposite to said one end thereof; and further including an elongate rod insertable into said open end of said core drill and engageable with said mandrel, whereby to apply a force to move said mandrel axially away from said open end of said core drill, whereby to allow said sleeve to contract enough to release said pilot tool unit from said core drill.

6. The combination of claim 1 wherein said pilot tool is a drill having a smaller diameter than the core drill with which said pilot tool unit is to be used.

7. The combination of a core drill for drilling an elongate hole in concrete or other dense masonry material and a pilot tool assembly for facilitating use of said core drill;

said core drill comprising an elongate hollow barrel having a rear end adapted to be connected to a powered driver and a front end having a cylindrical drilling head; and said pilot tool assembly comprising a pilot tool unit and a locking sleeve, said pilot tool unit including an elongate mandrel having opposite rear and front ends and a tapered outer surface, and a pilot tool secured to and projecting from said front end of the mandrel, said outer surface being tapered over at least a portion of the length of said mandrel so that the diameter of said tapered surface increases with increasing distance from said rear end of said mandrel, said locking sleeve surrounding and engaging said tapered outer surface of said mandrel, said locking sleeve being expandable radially and being made so that moving it relative to the mandrel in the direction of said front end of said mandrel will cause it to expand radially, said mandrel being disposed in said core drill at said front end thereof with said pilot tool projecting forward of said front end of said core drill and said mandrel and said sleeve being positioned so that said sleeve is expanded into tight locking engagement with the inner surface of the core drill and said outer surface of said mandrel, whereby said pilot tool unit is locked to said core drill.

8. The combination of claim 7 further including a push rod for use in removing said pilot tool assembly from said core drill, said push rod being sized to be insertable into said rear end of said core drill and to engage said mandrel, whereby said push rod can be used to force said mandrel to move relative to said locking sleeve in the direction of said drilling head so that said sleeve is confronted by a smaller diameter portion of said tapered surface and thereby allowed to contract radially enough to release it from tight engagement with said core drill, allowing said pilot tool unit and said locking sleeve to be removed from said core drill.

9. The combination of claim 7 further including a hollow tube disposed within said core drill at said rear end thereof, said hollow tube being engaged with said mandrel so as to limit the extent that said mandrel will project into said core drill.

10. The combination of claim 9 further including a push rod for use in removing said pilot drill bit assembly from said core drill, said push rod being sized to be insertable into said rear end of said core drill and through said hollow tube into engagement with mandrel, whereby said push rod can be used to force said mandrel to move relative to said locking sleeve in the direction of said drilling head so that said sleeve is confronted by a smaller diameter portion of said tapered surface and thereby allowed to contract radially enough to release it from tight engagement with said core drill, allowing said pilot drill unit and said locking sleeve to be removed from said core drill.

11. The combination of claim 7 wherein said pilot tool is an elongate rod.

12. The combination of claim 7 wherein said pilot tool is a drill having a smaller diameter than said core drill.

13. The combination of claim 7 further including one or more longitudinally-extending grooves in said outer surface of said mandrel.

14. A pilot tool assembly for a core drill comprising:

a pilot drill bit unit that includes an elongate mandrel having first and second opposite ends and a pilot drill secured to and projecting from first end of the mandrel, said mandrel having a tapered outer surface characterized by a diameter that increases with increasing distance from second end thereof; and an expandable locking sleeve that surrounds and engages said outer surface of said mandrel, said sleeve being made so that moving it relative to the mandrel in the direction of increasing mandrel diameter will cause the sleeve to expand radially, whereby when said pilot tool assembly is inserted into a core drill said sleeve will engage an inner surface of the core drill and will move axially relative to the mandrel until it has expanded enough to frictionally secure the mandrel to the core drill, thereby making the pilot drill an auxiliary extension of the core drill so that it can serve to pilot said core drill.

15. A pilot tool assembly for a core drill according to claim 14 further characterized in that said sleeve and said mandrel are arranged so that if said sleeve has been expanded radially by said mandrel, axial movement of said mandrel relative to said sleeve in the direction of increasing mandrel diameter will free said sleeve to contract radially.

16. The combination of a core drill for drilling deep holes in concrete and a pilot tool assembly for said core drill;

said core drill comprising an elongate hollow cylindrical barrel having a cylindrical drill bit at one end thereof;

said pilot tool assembly comprising a pilot tool unit adapted to extend into and project from said one end of said cylindrical barrel, and locking means for releasably locking said pilot tool unit to said core drill;

said pilot tool unit comprising an elongate mandrel and a pilot drill secured to and projecting from one end of the mandrel, said mandrel being tapered so that its outside diameter increases with increasing distance from one end thereof; and said locking means comprising an expandable sleeve that surrounds and engages the outer surface of the mandrel, said sleeve being made so that moving it relative to the mandrel in the direction of increasing mandrel diameter will cause the sleeve to expand radially, whereby when said pilot tool assembly is inserted into the drill bit end of a core drill said sleeve will engage the inner surface of the core drill and will move axially along the mandrel until it has expanded enough to frictionally secure the mandrel to the core drill, thereby making the pilot drill an auxiliary extension of the core drill so that it serve to pilot said core drill.

17. The combination of claim 16 wherein said sleeve and said mandrel are arranged so that if said sleeve has been expanded radially by said mandrel so as to frictionally secure the mandrel to the core drill, axial movement of said mandrel relative to said sleeve in the direction of increasing mandrel diameter will allow said sleeve to contract radially to free said mandrel from said core drill.

18. The combination of claim 16 wherein said core drill has an open end opposite to said one end thereof; and further including an elongate rod insertable into said open end of said core drill and engageable with said mandrel, whereby to apply a force to move said mandrel axially away from said open end of said core drill, whereby to allow said sleeve to contract enough to release said pilot tool assembly from said core drill.

19. The combination of a core drill for drilling an elongate hole in concrete or other dense masonry material and a pilot tool assembly for said core drill;

said core drill comprising an elongate hollow barrel having a rear end adapted to be connected to a powered driver and a front end having a cylindrical drilling head; and said pilot tool assembly comprising a pilot tool unit and a locking sleeve, said pilot tool unit including an elongate mandrel having opposite rear and front ends and a tapered outer surface, and a pilot drill secured to and projecting from said front end of the mandrel, said outer surface being tapered over at least a portion of the length of said mandrel so that the diameter of said tapered surface increases with increasing distance from said rear end of said mandrel, said locking sleeve surrounding and engaging said tapered outer surface of said mandrel, said locking sleeve being expandable radially and being made so that moving it relative to the mandrel in the direction of said front end of said mandrel will cause it to expand radially, said mandrel being disposed in said core drill at said front end thereof with said pilot drill projecting forward of said front end of said core drill and said mandrel and said sleeve being positioned so that said sleeve is expanded into tight locking engagement with the inner surface of the core drill and said outer surface of said mandrel, whereby said pilot tool unit is locked to said core drill.

20. The combination of claim 19 further including a hollow tube disposed within said core drill at said rear end thereof, said hollow tube being engaged with said mandrel so as to limit the extent that said mandrel will project into said core drill.

21. A method for drilling a hole of selected size at a selected location in a masonry material using a core drill, said method comprising the following steps:
  (a) drilling a pilot hole in said masonry material,
  (b) inserting into said pilot hole a pilot tool that is attached and projects from the front end of a core drill and makes a close fit with said pilot hole;
  (c) while maintaining said pilot tool in said pilot hole, drilling a larger hole in said masonry material with said core drill, said larger hole being coaxial with said pilot tool;
  (d) removing said pilot tool from said hole; and
  (e) extending the length of said larger hole using a core drill.

22. A method according to claim 21 wherein in step (b) a masonry drill is used as the pilot tool.

23. A method according to claim 22 wherein said masonry drill is used to form said pilot hole, and thereafter said drill is attached to said core drill.

24. A method according to claim 22 wherein said masonry drill projects from said core drill a distance greater than the length of said pilot hole, and further wherein said masonry drill operates to extend the length of said pilot hole as said larger hole is formed by said core drill.

25. A method according to claim 21 wherein in step (b) an elongate rod having a circular cross-sectional shape is used as the pilot tool.

26. A method according to claim 21 wherein in step (b) said pilot tool projects from the front end of said core drill a distance less than the length of said pilot hole, whereby to permit the core drill to drill said larger hole in said masonry material.

27. A pilot tool assembly according to claim 1 wherein said pilot tool is a drill.

28. A pilot tool assembly according to claim 1 wherein said pilot tool is an elongate rod having a smaller diameter than said locking sleeve.

29. A pilot rod assembly according to claim 1 further including one or more longitudinally-extending grooves in said outer surface of said mandrel.

* * * * *

UNITED STATES PATENT AND TRADEMARK OFFICE
CERTIFICATE OF CORRECTION

PATENT NO. : 6,514,017 B2
DATED : February 4, 2003
INVENTOR(S) : Michael J. DeBlasio It is certified that error appears in the above-identified patent and that said Letters Patent is hereby corrected as shown below:

Column 10,
Line 4, insert -- said -- before "second";
Line 49, delete the comma after "the";

Column 11,
Line 46, insert -- said -- before "mandrel";
Line 64, insert -- said -- before "first"; and Column 12,
Line 43, change "serve" to -- serves --.

Signed and Sealed this

Fifteenth Day of July, 2003

JAMES E. ROGAN
*Director of the United States Patent and Trademark Office*